(12) United States Patent
Ohsugi

(10) Patent No.: US 9,046,746 B2
(45) Date of Patent: Jun. 2, 2015

(54) PROJECTOR WITH OPTICAL COMPONENT FIXING ASSEMBLY HAVING SCREW AND SPACERS

(71) Applicant: CASIO COMPUTER CO., LTD., Tokyo (JP)

(72) Inventor: Naohiro Ohsugi, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 180 days.

(21) Appl. No.: 13/666,395

(22) Filed: Nov. 1, 2012

(65) Prior Publication Data

US 2013/0107231 A1 May 2, 2013

(30) Foreign Application Priority Data

Nov. 2, 2011 (JP) ................. 2011-240960

(51) Int. Cl.
*G03B 21/14* (2006.01)
*G02B 7/00* (2006.01)
*G02B 7/02* (2006.01)
*G03B 21/20* (2006.01)

(52) U.S. Cl.
CPC ............ *G03B 21/145* (2013.01); *G03B 21/204* (2013.01); *G02B 7/022* (2013.01); *G02B 7/003* (2013.01); *G03B 21/142* (2013.01)

(58) Field of Classification Search
CPC .... G03B 21/145; G03B 21/20; G03B 21/204; G03B 21/2046; G03B 21/2093; G03B 21/14; G03B 21/142; F21V 17/00; F21V 17/04; F21V 21/06; F21V 21/10; F21V 21/12; F21V 21/00; G02B 7/02; G02B 7/022; G02B 7/023

USPC ................ 353/84, 100–101, 119, 94; 362/84, 362/249.01, 382; 359/703, 811, 815, 819, 359/822

See application file for complete search history.

(56) References Cited

U.S. PATENT DOCUMENTS

| 2,766,799 | A | * | 10/1956 | Poupitch | 411/134 |
| 3,695,324 | A | * | 10/1972 | Gulistan | 411/111 |
| 5,283,599 | A | * | 2/1994 | Tejima et al. | 353/30 |
| 5,537,167 | A | * | 7/1996 | Toide et al. | 353/100 |
| 6,406,151 | B1 | * | 6/2002 | Fujimori | 353/119 |
| 6,565,216 | B2 | * | 5/2003 | Fujimori | 353/119 |
| 6,814,449 | B2 | * | 11/2004 | Yamada et al. | 353/74 |
| 6,905,214 | B2 | * | 6/2005 | Tani | 353/56 |
| 6,961,165 | B2 | * | 11/2005 | Uehara | 359/237 |
| 6,981,772 | B2 | * | 1/2006 | Kim | 353/81 |
| 7,061,699 | B2 | * | 6/2006 | Watanabe et al. | 359/819 |

(Continued)

FOREIGN PATENT DOCUMENTS

JP 2006-209832 A 8/2006

OTHER PUBLICATIONS

Alibaba.com, Hardware—Washers, Oct. 6, 2011 (p. 1) & Oct. 18, 2011 (p. 2).*

*Primary Examiner* — Jori S Reilly-Daikun
(74) *Attorney, Agent, or Firm* — Holtz, Holtz, Goodman & Chick PC

(57) ABSTRACT

An optical device includes an optical component fixed to a base member via spacers by screws. The spacers are inserted in at least one of a first space defined between the optical component and the base member and a second space defined between the base member and head portions of the screws, and a total thickness of the spacers is made constant.

12 Claims, 8 Drawing Sheets

(56) References Cited

U.S. PATENT DOCUMENTS

| | | | |
|---|---|---|---|
| 7,118,222 B2* | 10/2006 | Kitabayashi | 353/52 |
| 8,638,508 B2* | 1/2014 | Honma | 359/819 |
| 8,801,198 B2* | 8/2014 | Hirosawa | 353/119 |
| 2006/0187796 A1 | 8/2006 | Shibahara et al. | |
| 2010/0328632 A1* | 12/2010 | Kurosaki et al. | 353/98 |
| 2012/0147331 A1* | 6/2012 | Miyazaki | 353/31 |

* cited by examiner

PROJECTOR WITH OPTICAL COMPONENT FIXING ASSEMBLY HAVING SCREW AND SPACERS

CROSS-REFERENCE TO RELATED APPLICATION

This application is based upon and claims the benefit of priority under 35 USC 119 of Japanese Patent Application No. 2011-240960 filed on Nov. 2, 2011, the entire contents of which, including the description, claims, drawings and abstract, are incorporated herein by reference.

BACKGROUND OF THE INVENTION

1. Field of the Invention

The present invention relates to an optical device, an optical device fabrication method and a projector that includes the optical device.

2. Description of the Related Art

In these days, data projectors are used on many occasions as image projectors which project images including images of a screen and video images of a personal computer and further images based on image data which are stored in a memory card on to a screen. In these projectors, light emitted from a light source is collected on to a micromirror display element called a digital micromirror device (DMD) or a liquid crystal panel for projection of color images on to a screen.

Conventionally, the mainstream of these projectors has been those which utilize a high-intensity discharge lamp as a light source. In recent years, however, there have been made many developments and proposals on projectors that use as a light source light emitting diodes (LEDs), laser diodes, organic electroluminescent semiconductors or luminophors.

In these projectors, there is proposed a projector which includes a plurality of laser light sources and a plurality of collimator lenses that correspond to the plurality of laser light sources and in which excitation light that is emitted from the plurality of laser light sources via the plurality of collimator lenses is collected to be shone on to a luminescent material layer of a luminescent wheel via collective lenses so as to emit luminescent light from the luminescent material layer.

In a light source unit of this projector, an optical device using mirrors and lenses is used to combine optical axes of red, green and blue light so as to be guided to a light guiding device such as a light tunnel.

In addition, Japanese Unexamined Patent Publication (KOKAI) No. 2006-209832 discloses an optical device fabrication method in which a positional adjustment is carried out by employing a plurality of spacers of a predetermined thickness.

This optical device is such as to control the position of a movable member including, for example, an optical element of an optical head system of a compact disc player by driving a drive magnet of the optical head system.

In the optical device described in Japanese Unexamined Patent Publication (KOKAI) No. 2006-209832, in adjusting the height, a thickness resulting when the movable member is fastened by tightening screws changes in accordance with the number of spacers disposed. This changes the fitting amount of the screws, which requires a tightening torque to be adjusted every time the screws are tightened.

BRIEF SUMMARY OF THE INVENTION

The invention has been made with a view to solving the aforesaid problems which is inherent in the related art, and an object of the invention is to suppress the fabrication costs to a lower level by simplifying fabrication steps and to provide a high-performance optical device, a fabrication method of this optical device and a projector that includes the optical device.

With a view to attaining the object, according to a first aspect of the invention, there is provided an optical device, wherein an optical component is fixed to a base member via spacers by a screw, and wherein the spacers are inserted in at least either of a first space defined between the optical component and the base member and a second space defined between the base member and a head portion of the screw, and a total thickness of the spacers is made constant.

According to a second aspect of the invention, there is provided an optical device fabrication method of fixing an optical component to a base member via spacers by a screw, including a temporary fastening process of temporarily fastening the optical component to the base member by a screw, an adjustment process of adjusting a distance between the optical component and the base member by inserting a spacer of a predetermined thickness between the optical component and the base member as required, and a tightening process of inserting a different spacer of a thickness by which a fitting amount of the screw into the optical component is made constant between the base member and a head portion of the screw and tightening the screw.

According to a third aspect of the invention, there is provided a projector including a light source device which is the optical device set forth above, a display element, a light source side optical system that guides light from the light source device to the display element, a projection side optical system that projects an image emitted from the display element on to a screen, and a projector control system that controls the light source device and the display element.

DETAILED DESCRIPTION OF THE PREFERRED EMBODIMENT

Hereinafter, an embodiment of the invention will be described by reference to the drawings.

Figure 1:
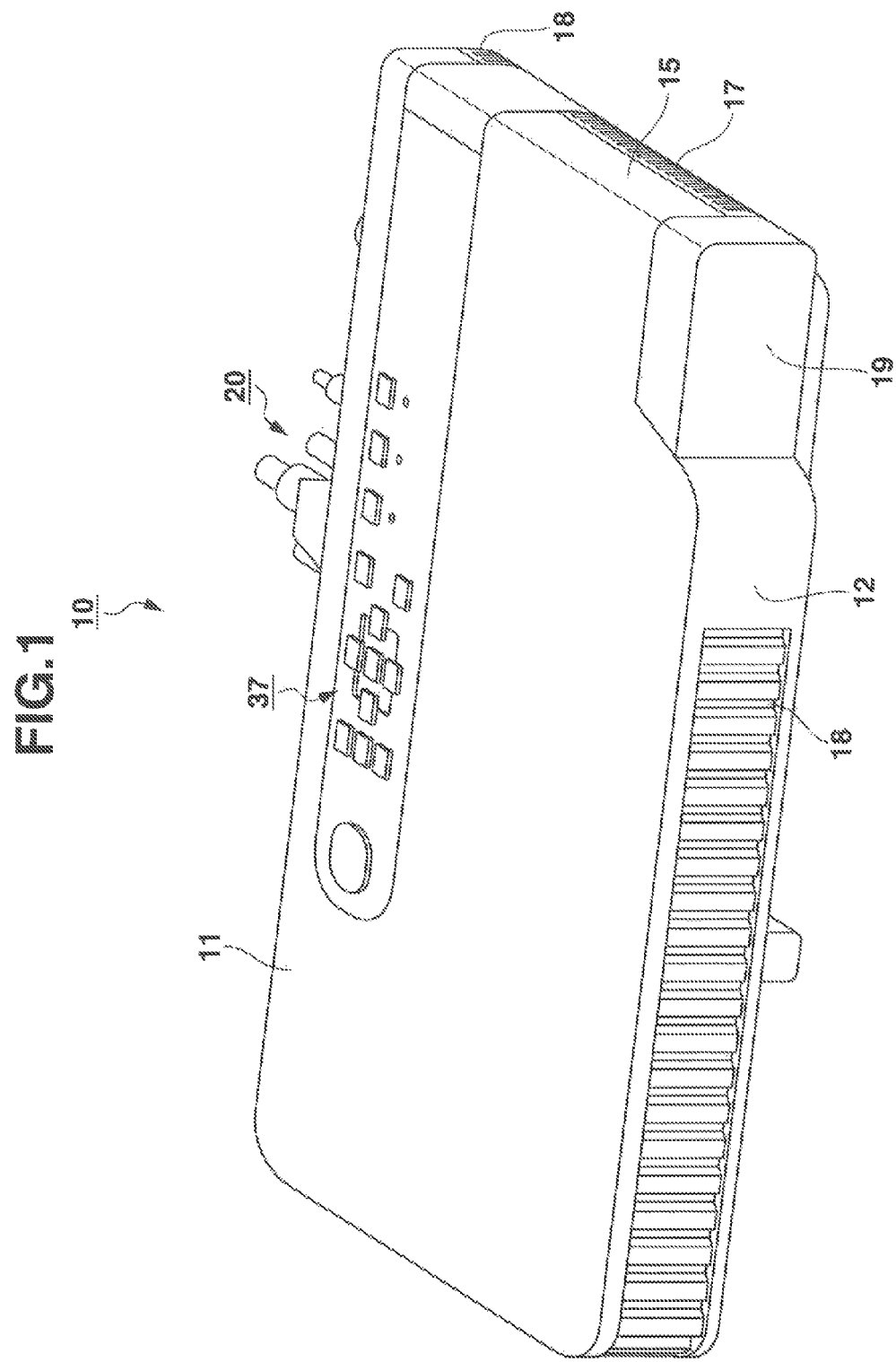
FIG. 1 is a perspective view showing an external appearance of a projector according to an embodiment of the invention.

FIG. 1 is a perspective view showing an external appearance of a projector 10. It should be noted that when referred to with respect to the projector 10 in the following description of the embodiment, "left" and "right" denote, respectively, left and right directions with respect to a projecting direction of the projector 10, and "front" and "rear" denote, respectively, front and rear directions with respect to the direction of a screen side of the projector 10 and a traveling direction of a pencil of light.

Then, as shown in FIG. 1, the projector 10 has a substantially rectangular parallelepiped shape and has a lens cover 19 which covers a projection opening that is laid to a side of a front side panel 12 which is referred to as a front side panel of a projector casing. Additionally, a plurality of outside air inlet ports 18 are formed in the front side panel 12.

Further, although not shown in FIG. 1, the projector 10 includes an Ir reception unit which receives a control signal from a remote controller.

In addition, a keys/indicators unit 37 is provided on an upper side panel 11 of the projector casing. Disposed on this keys/indicators unit 37 are keys and indicators which include a power supply switch key, a power indicator which informs whether the power supply is on or off, a projection switch key which switches on or off the projection by the projector, and an overheat indicator which informs of an overheat condition when a light source unit, a display element, a control circuit or the like overheats.

Further, provided on a back side or a back side panel of the projector casing are an input/output connector unit where USB terminals, a video signal input D-SUB terminal into which an analog RGB video signal is inputted, an S terminal, an RCA terminal, an audio output terminal and the like are provided and various types of terminals 20 including a power supply adaptor plug and the like.

Additionally, a plurality of outside air inlet ports are formed in the back side panel. In addition, pluralities of inside air outlet ports 17 are formed in a right side panel which is a lateral side panel of the projector casing which is not shown and a left side panel 15 which is a lateral side panel shown in FIG. 1. Further, outside air inlet ports 18 are also formed in a position on the left side panel 15 which lies near a corner portion between the left side panel 15 and the back side panel.

Figure 2:
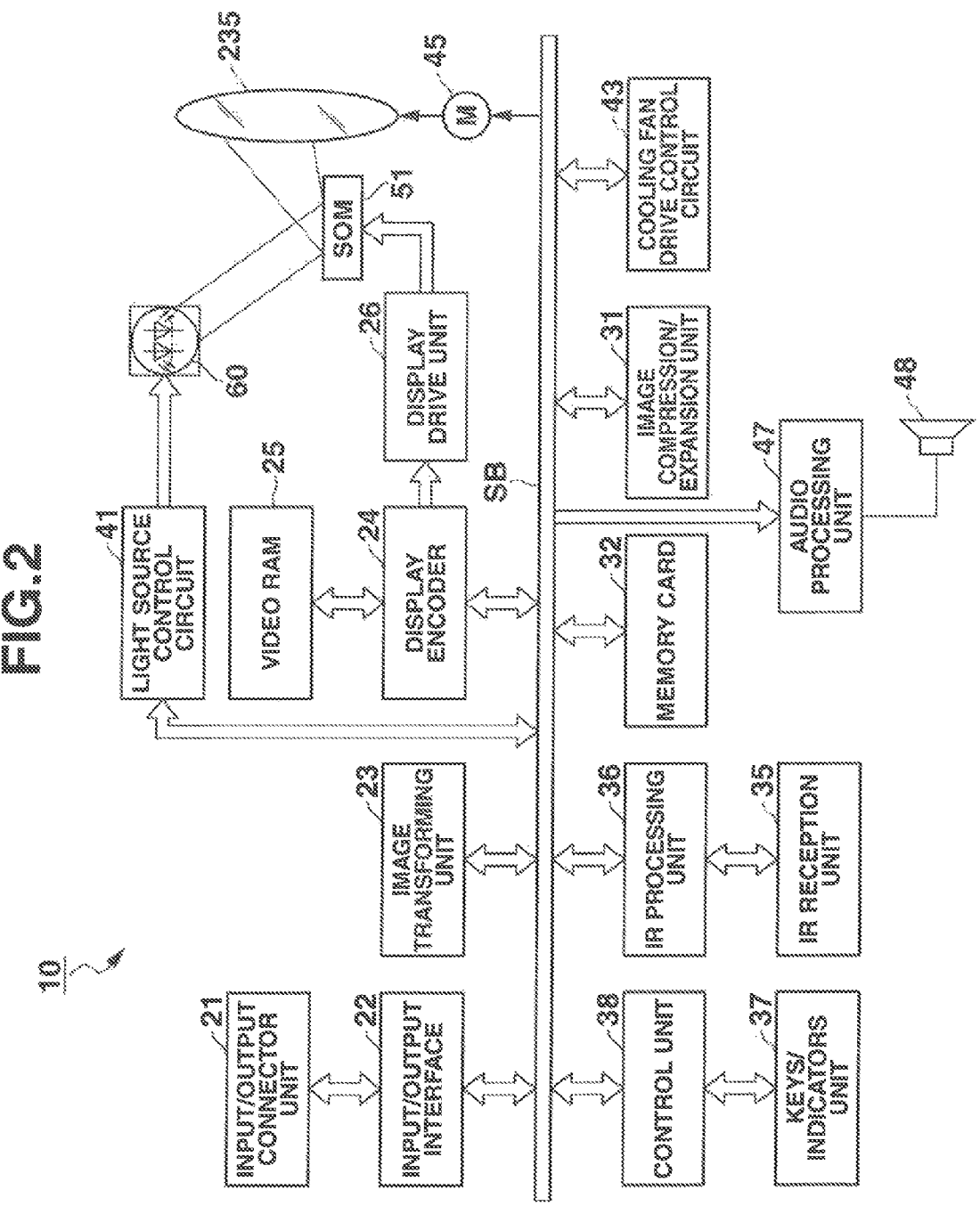
FIG. 2 is a functional block diagram of the projector according to the embodiment of the invention.

Next, a projector control system of the projector 10 will be described by use of a functional block diagram shown in FIG. 2.

The projector control system includes a control unit 38, an input/output interface 22, an image transforming unit 23, a display encoder 24, a display drive unit 26 and the like.

The control unit 38 governs the control of respective operations of circuitries within the projector 10 and includes a CPU, a ROM which stores in a fixed fashion operation programs of various types of settings and a RAM which is used as a working memory.

Then, in this projector control system, image signals of various standards that are inputted from the input/output connector unit 21 are sent via the input/output interface 22 and a system bus (SB) to the image transforming unit 23 where the image signals are transformed so as to be unified into an image signal of a predetermined format which is suitable for display. Thereafter, the image signals so transformed are outputted to the display encoder 24.

In addition, the display encoder 24 deploys the image signals that have been inputted thereinto on a video RAM 25 for storage therein and generates a video signal from the contents stored in the video RAM 25, outputting the video signal so generated to the display drive unit 26.

The display drive unit 26 functions as a display element control unit and drives a display element 51 which is a spatial optical modulator (SOM) at an appropriate frame rate in response to the image signal outputted from the display encoder 24.

Additionally, in this projector 10, a pencil of light that is emitted from a light source unit 60 is shone on to the display element 51 via a light source side optical system, which will be described later, to thereby form an optical image based on reflected light reflected by the display element 51. The image so formed is then projected on to a screen, not shown, for display thereon via a projection side optical system.

In addition, a movable lens group 235 of this projection side optical system is driven by a lens motor 45 for zooming or focusing.

Additionally, an image compression/expansion unit 31 executes a recording process in which a luminance signal and a color difference signal of an image signal are data compressed through processes such as ADCT and Huffman coding, and the compressed data is then sequentially written on to a memory card 32 which is configured as a detachable recording medium.

Further, when in a reproducing mode, the image compression/expansion unit 31 reads out the image data which is recorded on the memory card 32 and expands individual image data which make up a series of dynamic images frame by frame. Then, the image data is outputted to the display encoder 24 via the image transforming unit 23 so as to enable the display of dynamic images based on the image data stored on the memory card 32.

Then, operation signals generated at the keys/indicators unit 37 which includes the main keys, indicators and the like which are provided on the upper side panel 11 of the projector casing are sent out directly to the control unit 38.

Key operation signals from the remote controller are received by the Ir reception unit 35, and a code signal which is demodulated at an Ir processing unit 36 is outputted to the control unit 38.

In addition, an audio processing unit 47 is connected to the control unit 38 via the system bus (SB). This audio processing unit 47 includes a circuitry for a sound source such as a PCM sound source. When in a projection mode and a reproducing mode, the audio processing unit 47 converts audio data into analog signals and drives a loudspeaker 48 to radiate loudly sound or voice based on the audio data.

In addition, the control unit 38 controls a light source control circuit 41 which is configured as a light source control unit. This light source control circuit 41 controls individually the emission of light in the red wavelength band, light in the green wavelength band and light in the blue wavelength band from the light source unit 60 so that light in the predetermined wavelength bands as required is emitted from the light source unit 60 when an image is produced.

Further, the control unit 38 causes a cooling fan drive control circuit 43 to detect temperatures through a plurality of temperature sensors which are provided in the light source unit 60 or the like so as to control the rotating speeds of cooling fans based on the results of the temperature detection.

Additionally, the control unit 38 also causes the cooling fan drive control circuit 43 to make the cooling fans continue to rotate even after the power supply of a projector main body is switched off by use of a timer or the like. Alternatively, the control unit 38 causes the cooling fan drive control circuit 43 to make the power supply to the projector main body be switched off depending upon the results of the temperature detection by the temperature sensors.

Next, an internal construction of the projector 10 will be described.

Figure 3:
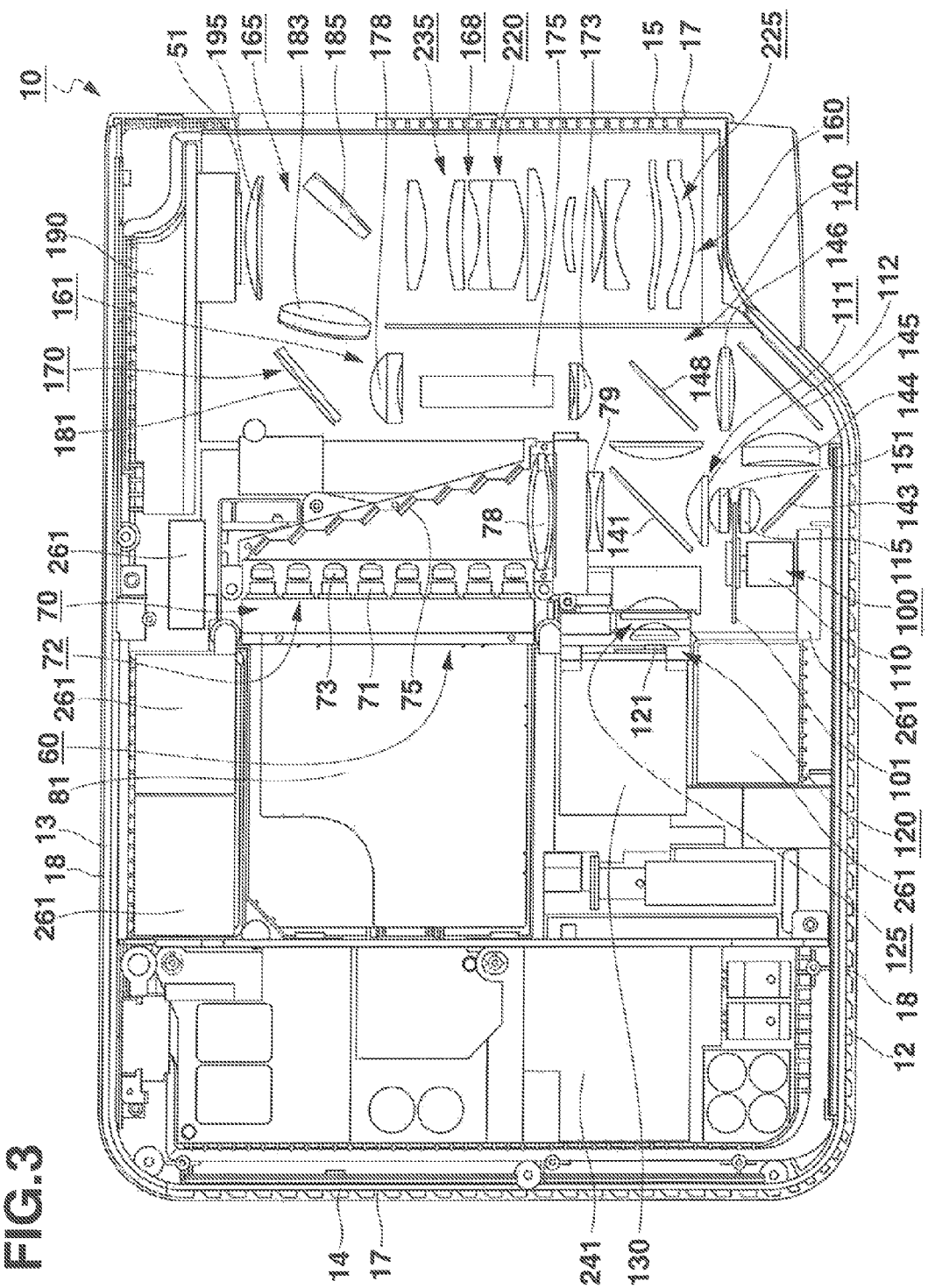
FIG. 3 is an exemplary plan view showing an internal construction of the projector according to the embodiment of the invention.

FIG. 3 is an exemplary plan view showing an internal construction of the projector 10.

As shown in FIG. 3, the projector 10 includes a control circuit board 241 in the vicinity of the right side panel 14. This control circuit board 241 includes a power supply circuit block, a light source control block and the like. Additionally, the projector 10 includes the light source unit 60 which is provided to a side of the control circuit board 241, that is, at a substantially central portion of the projector casing. Further, the projector 10 includes an optical system unit 160 that is disposed between the light source unit 60 and the left side panel 15.

The light source unit 60 includes an excitation light shining device 70, a luminescent light emitting device 100, a red light source device 120 and light guiding optical system 140. The excitation light shining device 70 is disposed at a substantially central portion in a left-to-right direction of the projector casing and near the back side panel 13. The luminescent light emitting device 100 is disposed on an optical axis of a pencil of light emitted from the excitation light shining device 70 and near the front side panel 12. The red light source device 120 is disposed between the excitation light shining device 70 and the luminescent light emitting device 100. The light guiding optical system 140 changes an optical axis of light emitted from the luminescent light emitting device 100 and an optical axis of light emitted from the red light source device 120 into the same optical axis and then collects light of relevant colors to a light incident end of a light tunnel 175 that constitutes a predetermined plane thereof.

The excitation light shining device 70 includes a light source group 72 that include a plurality of excitation light sources 71 that are disposed so that optical axes thereof become parallel to the back side panel 13, a plurality of reflection mirrors which each turn an optical axe of light emitted from each of the excitation light sources 71 by 90 degrees in the direction of the front side panel 12, a collective lens 78 which collects light emitted from the excitation light sources 71 and reflected by the plurality of reflection mirror group 75, and a heat sink 81 which is disposed between the excitation light sources 71 and the right side panel 14.

In the light source group 72, in total, 24 excitation light sources 71 which are blue laser emitting devices are arranged into a matrix of three rows and eight columns.

In addition, collimator lenses 73 are disposed individually on optical axes of the excitation light sources 71, and these collimator lenses 73 convert light emitted from the excitation light sources 71 into parallel light so as to enhance the directionality thereof. Additionally, the reflection mirrors 75 are arranged into the shape of steps so that pencils of light emitted from the excitation light sources 71 are reflected towards the collective lens 78 and further towards a convex lens 79 while reducing the sectional area of a pencil of light emitted from the light source group 72 in a horizontal direction by narrowing spaces between the pencils of light that are emitted from the individual excitation light sources 71.

Two cooling fans 261 are disposed between the heat sink 81 and the back side panel 13, and the excitation light sources 71 are cooled by the cooling fans 261 and the heat sink 81. Further, a cooling fan 261 is also disposed between the reflecting mirrors 75 and the back side panel 13, and the reflecting mirrors 75 and the collective lens 78 are cooled by this cooling fan 261.

The luminescent light emitting device 100 includes a luminescent wheel 101 which is disposed so as to be parallel to the front side panel 12, that is, so as to be at right angle to optical axes of light that is emitted from the excitation light shining device 70, a wheel motor 110 that rotationally drives the luminescent wheel 101, a collective lens group 111 having a collective lens 151 and the like that collects a pencil of light emitted from the excitation light shining device 70 to the luminescent wheel 101 and that collects a pencil of light emitted from the luminescent wheel 101 in the direction of the back side panel 13, and a collective lens 115 that collects a pencil of light emitted from the luminescent wheel 101 in the direction of the front side panel 12.

On the luminescent wheel 101, a green luminescent light emitting area that receives light emitted form the excitation light shining device 70 as excitation light to emit luminescent light in the green wavelength band and a diffuse transmission area that transmits light emitted from the excitation light shining device 70 in a diffusing fashion are provided end to end in a circumferential direction.

In addition, a base of the green luminescent light emitting area is a metallic base made of copper or aluminum or the like, and a surface of a side of the base that faces the back side panel 13 is mirror-finished through silver deposition or the like, and a green luminescent material layer is laid on the mirror-finished surface.

Further, a base of the diffuse transmission area is a transparent base having light transmission properties, and minute irregularities are formed on a surface of the base through sandblasting.

Then, light from the excitation light shining device 70 and which is shone on to the green luminescent material layer on the luminescent wheel 101 excites a green luminescent material on the green luminescent material layer. Pencils of luminescent light generated through luminescence and emitted in every direction from the green luminescent material are emitted directly towards the back side panel 13 or are reflected on the surface of the luminescent wheel 101 to thereafter be emitted towards the back side panel 13 and are then incident on the collective lens group 111.

In addition, light emitted from the excitation light shining device 70 and shone on to the diffuse transmission area of the luminescent wheel 101 is diffused by the minute irregularities and is then incident on the collective lens 115 as diffuse transmission light. Then, a cooling fan 261 is disposed between the wheel motor 110 and the front side panel 12, and the luminescent light emitting device 100 is cooled by this cooling fan 261.

The collective lens group 111 will be described in detail later as an example to which an optical device of the invention is applied.

The red light source device 120 is a single-colored light emitting device which includes a red light source 121 and a collective lens group 125. The red light source 121 is disposed so that an axis thereof becomes parallel to the excitation light sources 71. The collective lens group 125 collects light emitted from the red light source 121. The red light source 121 is a red light emitting diode that emits light in the red wavelength band.

Additionally, the red light source device 120 is disposed so that an optical axis thereof is at right angle to light emitted from the excitation light shining device 70 and light of the green wavelength band that is emitted from the luminescent wheel. Further, the red light source 120 includes a heat sink 130 that is disposed on a side of the red light source 121 that faces the right side panel 14. Additionally, a cooling fan 261 is disposed between the heat sink 130 and the front side panel 12, and the red light source 121 is cooled by this cooling fan 261.

The light guiding optical system 140 include collective lenses that collect pencils of light in the red, green and blue wavelength bands, reflection mirrors that turn optical axes of pencils of light of the wavelength bands of the respective colors into the same optical axis, dichroic mirrors and the like.

Specifically, a dichroic mirror 141 is disposed in a position where light of the blue wavelength band that is emitted from the excitation light shining device 70 and light of the green wavelength band that is emitted from the luminescent wheel 101 intersect light of the red wavelength band that is emitted from the red light source device 120. This dichroic mirror 141 transmits light of the blue and red wavelength bands and reflects light of the green wavelength band so as to turn the optical axis of this green light by 90 degrees in the direction of the left side panel 15.

A first reflection mirror 143 is disposed on the optical axis of light of the blue wavelength band that passes through the luminescent wheel 101 while being diffused, that is, between a collective lens 115 and the front side panel 12. This first reflection mirror 143 reflects the light of the blue wavelength band so as to turn the optical axis of the blue light by 90 degrees in the direction of the left side panel 15.

Further, a second reflection mirror 145 is disposed on the optical axis of the light of the blue wavelength band that is reflected by the first reflection mirror 143 and near an optical system unit 160, and this second reflection mirror 145 turns the optical axis of the blue light by 90 degrees in the direction of the back side panel 13.

In addition, a second dichroic mirror 148 is disposed in a position where the optical axis of the light of the red wavelength band that passes through the first dichroic mirror 141 and the optical axis of the light of the green wavelength band that is reflected by the first dichroic mirror 141 so that the optical axis thereof coincides with the optical axis of the light of the red wavelength band intersect the optical axis of the light of the blue wavelength band that is reflected by the second reflection mirror 145. This second dichroic mirror 148 transmits the light of the blue wavelength band and reflects the light of the red and green wavelength bands to turn the optical axes of the red and green light by 90 degrees in the direction of the back side panel 13.

Additionally, collective lenses are disposed individually between the dichroic mirrors and the reflection mirrors.

Further, a collective lens 173 is disposed near the light tunnel 175, and this collective lens 173 collects light source light to the light incident end of the light tunnel 175.

The optical system unit 160 is formed substantially into a U-shape by three blocks: an illumination side block 161, an image generation block 165 and a projection side block 168. The illumination side block 161 is positioned to a left-hand side of the excitation light shining device 70, the image generation block 165 is positioned near a position where the back side panel 13 intersects the left side panel 15, and the projection side block 168 is positioned between the light guiding optical system 140 and the left side panel 15.

This illumination side block 161 includes part of a light source side optical system 170 which guides light source light emitted from the light source unit 60 to the display element 51 that the image generation block 165 possesses. Raised as the part of the light source side optical system 170 that the illumination side block 161 possesses are the light tunnel 175 that converts a pencil of light that is emitted from the light source unit 60 into a pencil of light in which the intensity is uniformly distributed, a collective lens 178 that collects light emitted from the light tunnel 175 and an optical axis turning mirror 181 that turns the optical axis of a pencil of light emitted from the light tunnel 175 in the direction of the image generation block 165.

The image generation block 165 possesses, as a part of the light source side optical system 170, a collective lens 183 that collects the light source light that is reflected on the optical axis turning mirror 181 to the display element 51 and a shining mirror 185 that shines the pencil of light that passes through the collective lens 183 on to the display element 51 at a predetermined angle. Further, the image generation block 165 includes a DMD, which is the display element 51. A heat sink 190 is disposed between the display element 51 and the back side panel 13 for cooling the display element 51. The display element 51 is cooled by the heat sink 190. Additionally, a condenser lens 195 is disposed near the front of the display element 51 as a part of a projection side optical system 220.

The projection side optical system 168 possesses a lens group of the projection side optical system 220 which projects "ON" light that is reflected on the display element 51 on to a screen. The projection side optical system 220 includes a fixed lens group 225 that is incorporated in a fixed barrel and a movable lens group 235 that is incorporated in a movable barrel. These are made into a variable-focus lens with a zooming function, and the movable lens group 235 is moved by a lens motor 45 for zooming and focusing.

Next, as an optical device of the invention, a configuration in which each of the lenses and mirrors of the light guiding optical system 140 is disposed on a base member will be described in detail by reference to the drawings.

Figure 4:
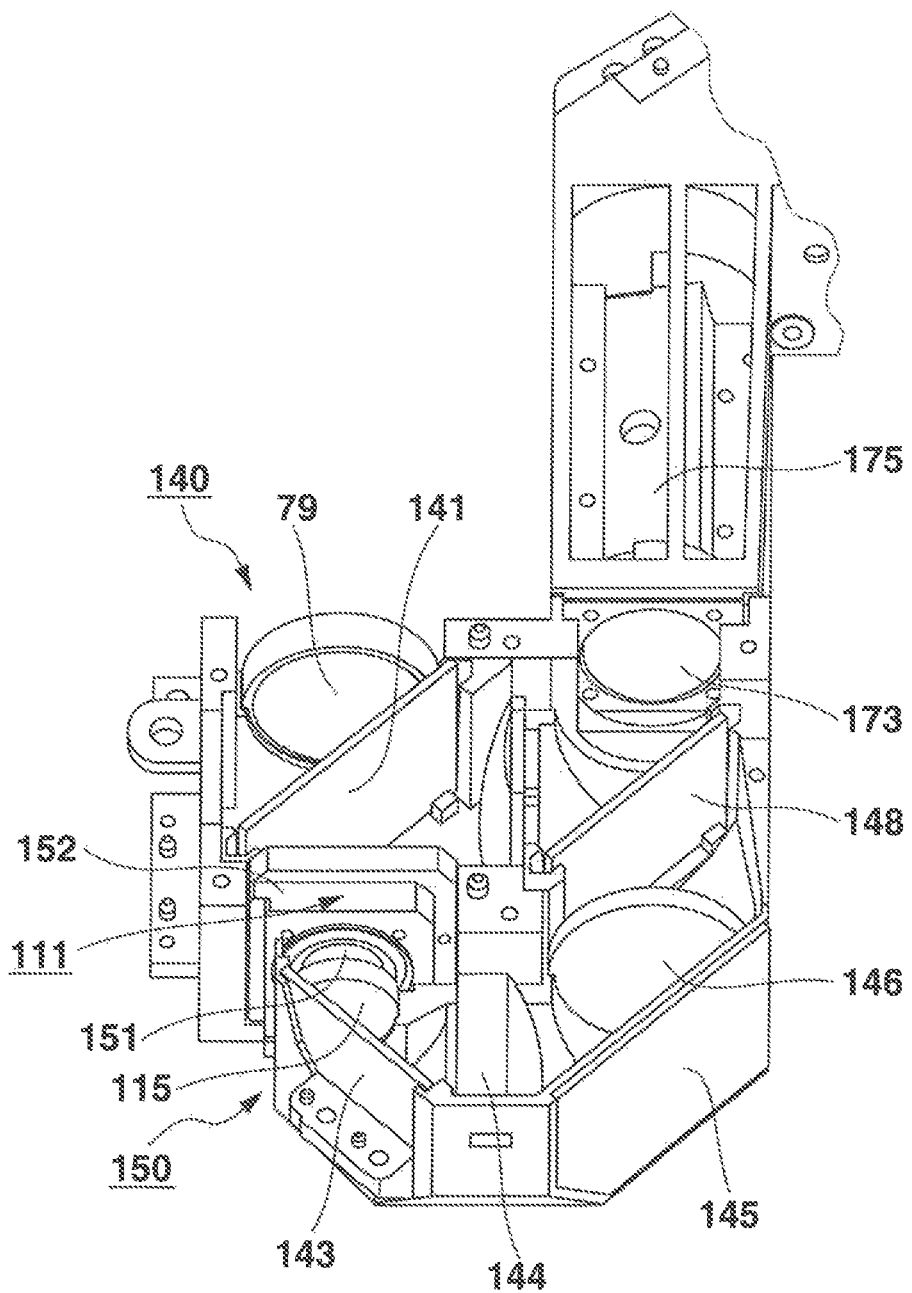
FIG. 4 is a front perspective view of an optical device which is a light guiding optical system according to the embodiment of the invention.

FIG. 4 is a front perspective view showing the construction of an optical device in an interior of the projector 10 with an upper cover thereof removed.

This optical device is combined with the excitation light shining device 70, the red light source device 120 and the luminescent wheel 101 so as to make up the light source unit 60 of the projector 10.

This optical device is the light guiding optical system 140 that has been described above. In the construction of this optical system, as shown in FIG. 4, a thin and substantially pentagonal base member 150 that is made of a hard resin or a metal is disposed in a bottom portion of the projector 10, and lens frames including a lens frame 152 that fix the lenses in place and mirror frames are mounted on an upper surface of the base member 150 and thereby the lenses and mirrors are disposed in predetermined positions.

In the optical device as the light guiding optical system 140, as shown in FIG. 4, the concave lens 79, the first dichroic mirror 141, the first reflection mirror 143, the second reflection mirror 145, the second dichroic mirror 148, as well as the collective lens group 111 having the collective lens 151 disposed between the dichroic mirror and the reflection mirror, the collective lenses 144, 146 and the like are disposed on the upper surface of the base member 150.

Further, the collective lens 173 adapted to collect light source light to the incident end of the light tunnel 175 is disposed near the light tunnel 175.

The lenses and mirrors are fixed individually to the lens frames and mirror frames that are provided individually therefor so as to be mounted in the predetermined positions on the base member 150. Additionally, in the event that optical axes of light emitted from the individual light sources deviate, the light collection efficiency is reduced, which lowers luminance, and therefore, an optical axis adjustment is necessary.

The optical axis adjustment of light emitted from the light sources is carried out as required when the lens frames and the mirror frames are mounted on the base member 150 so that the optical axes of light of the respective colors that are incident on the incident end of the light tunnel 175 are incident on a predetermined position at a predetermined angle.

In addition, there may be a situation in which it becomes effective from the viewpoint of workability and ease with which the adjustment is carried out to execute the adjustment of the optical axes finally when the collective lens 144 and the collective lens 146 are mounted.

In this embodiment, a positioning adjustment in a vertical direction as a final fine adjustment of an optical axis of light emitted from the excitation light source 71 to be incident on the light tunnel 175 is carried out, when the collective lens 151 of the collective lens group 111 is disposed in a predetermined position on the base member 150. This collective lens 151 is a lens that is disposed close to the luminescent wheel 101 and that not only collects a pencil of light emitted from the excitation light source 71 to the luminescent wheel 101 but also collects a pencil of light emitted in the direction of the excitation light source 71. Then, a configuration that is carried out in the final optical axis fine adjustment will be described based on the drawings.

Figure 5:
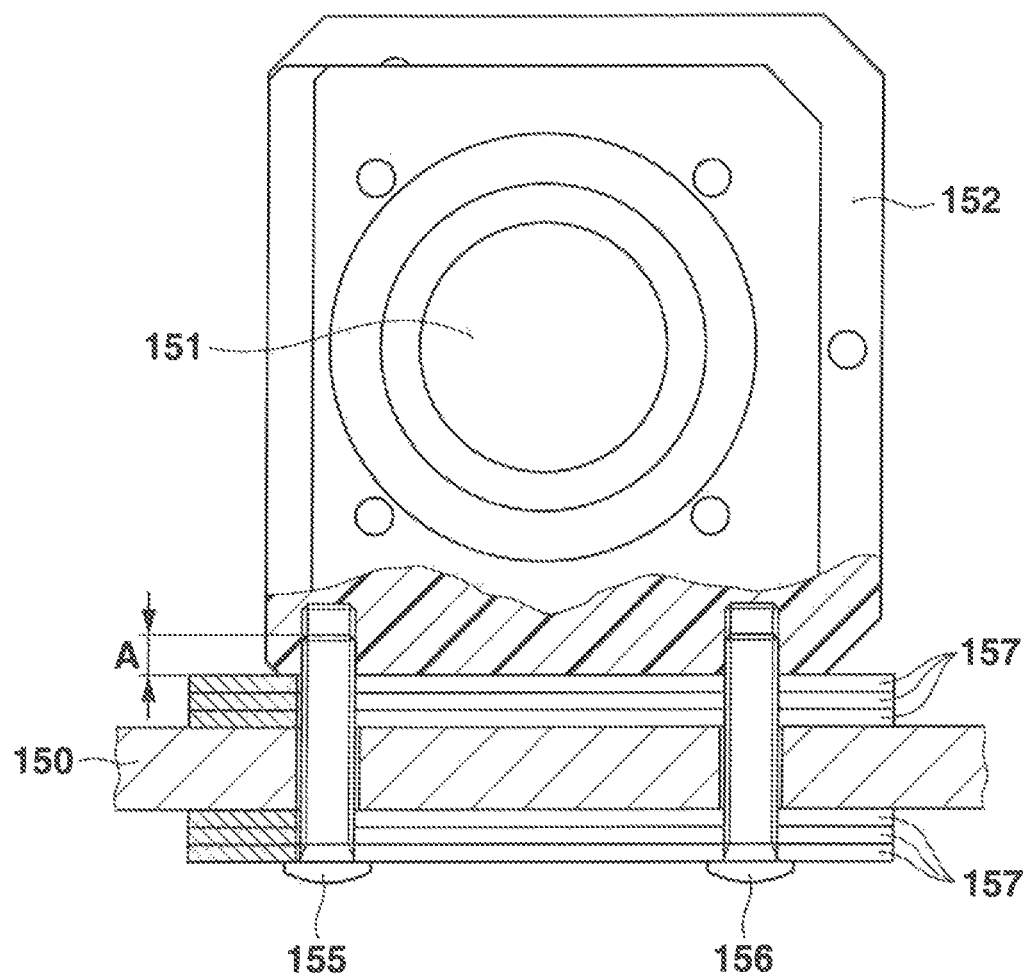
FIG. 5 is a diagram depicting a fabrication example of the optical device according to the embodiment of the invention.
Figure 6:
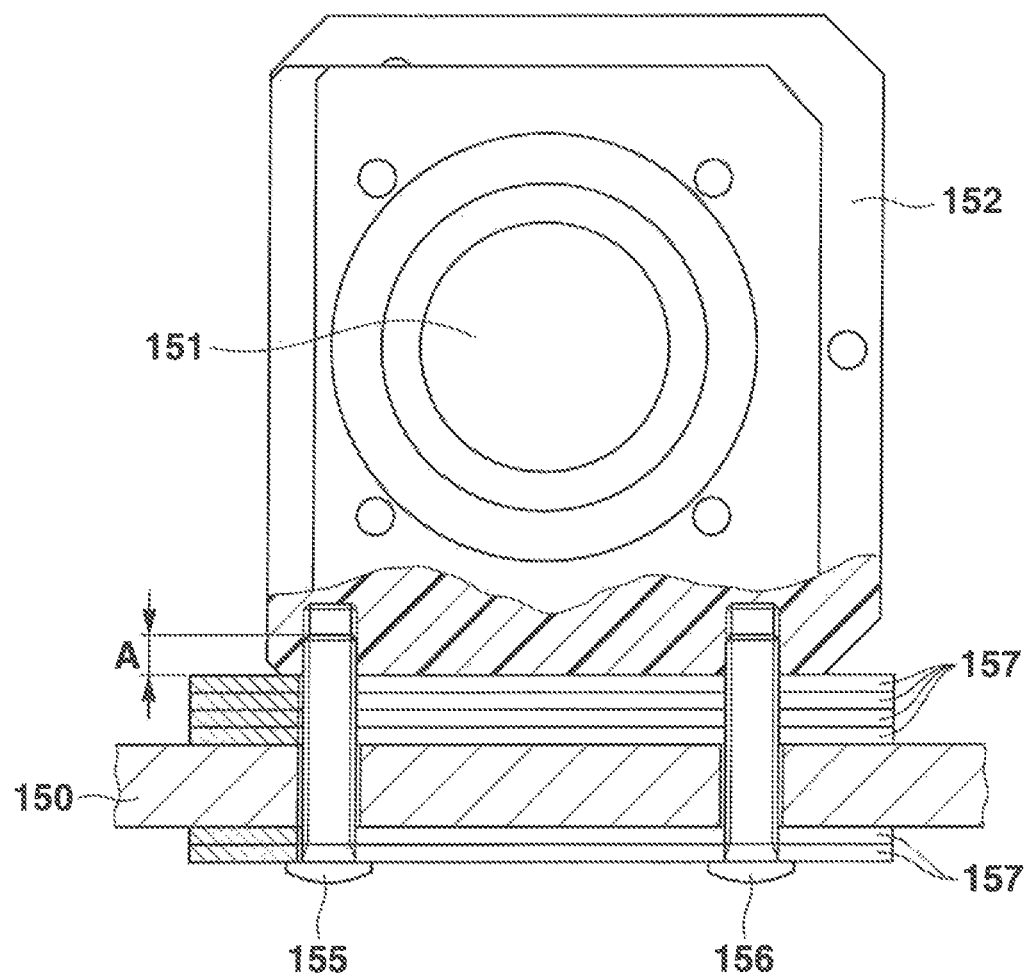
FIG. 6 is a diagram depicting another fabrication example of the optical device according to the embodiment of the invention.

FIG. 5 is an explanatory diagram in relation to an example in which three upper spacers 157 and three lower spacers are inserted in the optical device. FIG. 6 is an explanatory diagram in relation to an example in which four upper spacers and two lower spacers are inserted in the optical device. Note that in this embodiment, when referred to with respect to the optical device, "upper" and "lower" mean upper and lower, respectively, when the projector 10 is placed normally on a table.

As shown in FIG. 5 or 6, this optical device includes the base member 150, the collective lens 151 that is an optical component that makes up part of the collective lens group 111, the lens frame 152 that fixes the collective lens 151 in place, two screws 155, 156 that are used to fix the lens frame 152 on the base member 150 and a predetermined number of spaces 157 that is used for adjusting the mounting position of the lens frame 152 in a vertical direction.

The base member 150 is a thin square plate formed of a hard resin or a metal. Recesses, projections, groove portions and mounting holes are provided on an upper surface and a lower surface of the base member 150 for mounting the lenses and mirrors of the light guiding optical system 140, the luminescent light emitting device 100 and the like in the predetermined positions.

As has been described above, the collective lens 151 is the lens that is included in the collective lens group 111 and that not only collects a pencil of light emitted from the excitation shining device 70 to the luminescent wheel 101 but also collects a pencil of light emitted from the luminescent wheel 101 in the direction of the excitation light shining device 70 in a position lying close to the luminescent wheel 101. Namely, the collective lens 151 is the lens that collects individually the pencil of light emitted from the excitation light sources 71 to the luminescent wheel 101 and the pencil of light reflected from the luminescent wheel 101 in the direction of the excitation light shining device 70.

Additionally, since incident light on the luminescent wheel 101 is a pencil of light that has a smallest exit angle, the sensitivity with respect to luminance performance is high, and luminance is dropped merely by a slight deviation in mounting position of the collective lens 151. Because of this, it is important to make a fine adjustment of the optical axis of light that has passed through the collective lens 151 by adjusting the collective lens 151 by moving it.

The lens frame 152 is a rectangular plate member made of a hard resin and has a hole in which the collective lens 151 is disposed in the center thereof. Then, by disposing the lens frame 152 in a predetermined position on the base member 150, the optical axis of a pencil of light incident on the collective lens 151 in the left-to-right direction coincides with the optical axis of the collective lens 151 in the left-to-right direction.

The screws 155, 156 are screwed vertically into the base member 150 in two locations thereon from below to above the base member 150 to fix the lens frame 152, which is an optical component, on to the base member 150.

The spacers 157 are each a U-shaped stainless steel material and have the same thickness (for example, 0.2 mm) and the same shape. The spacers 157 are such that a required number of spacers out of a predetermined number of, for example, six spacers are inserted between the base member 150 and the lens frame 152 from a side to adjust the position of the optical axis of the collective lens 151 in a height direction (a vertical direction).

Namely, the position of incident light on the light incident end of the light tunnel 175 is changed by changing the position of the collective lens 151 in the vertical direction as shown in FIGS. 5, 6 to thereby change the optical axis of light that passes through the collective lens 151 in the vertical direction.

Then, the remaining spacers 157 that result after the required number of spacers are used from the predetermined number of spacers are inserted between the base member 150 and head portions of the screws 155, 156 from the side, and thereafter, the screws 155, 156 are tightened to fix the lens frame 152 to the base member 150.

By adopting the configuration described heretofore, in the optical device, when the lens frame 152 is mounted on the base member 150 to be fixed thereto, even though the number of spacers 157 that are disposed on the upper surface of the base member 150 is changed, the remaining spacers 157 that result from reduction of a required number of spacers from the predetermined number of spacers are inserted underneath the lower surface of the base member 150, whereby a fitting amount A of the screws 155, 156 into the lens frame 152 can be made constant.

Consequently, a tightening torque of the screws 155, 156 can be made constant, thereby making it possible to enhance the working efficiency and reliability in assembling the lens frame 152 on to the base member 150.

Next, an optical device fabrication method of the invention will be described by reference to FIGS. 7, 8.

Figure 7:
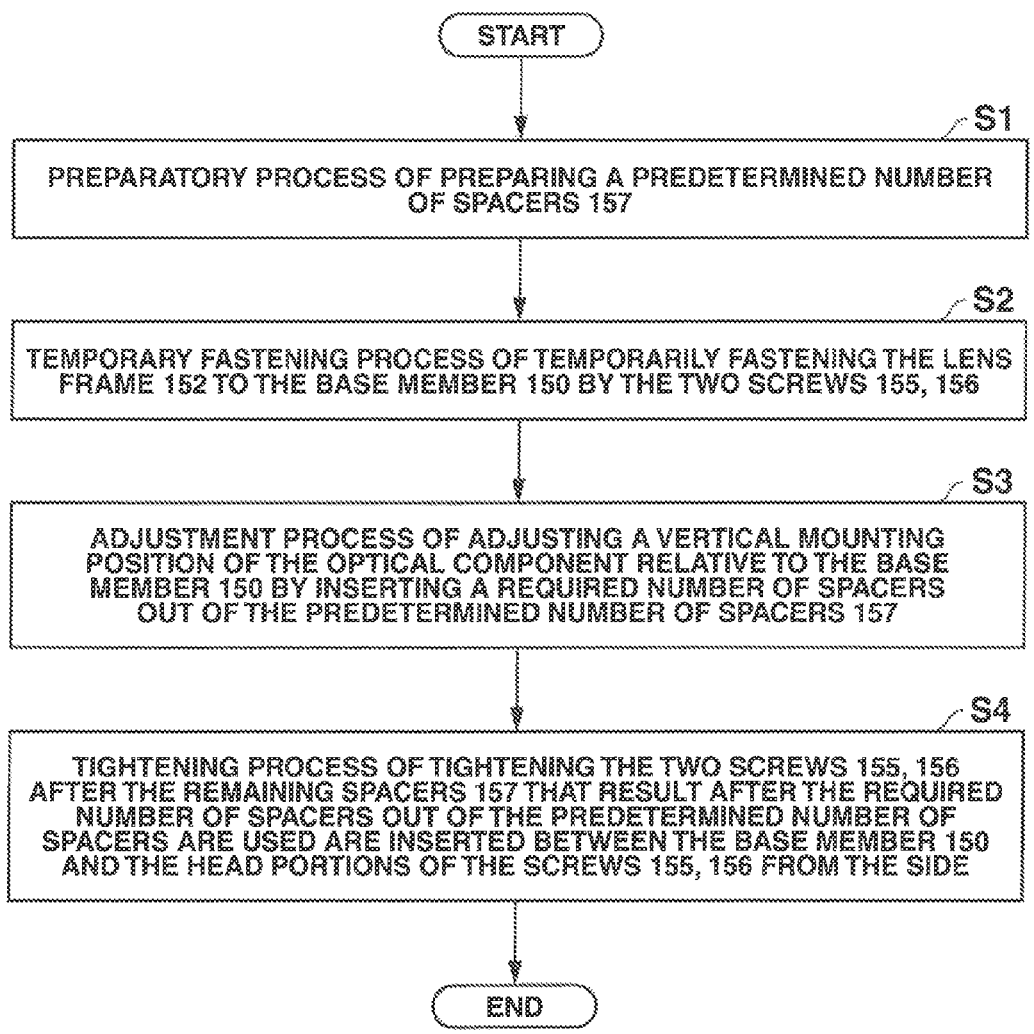
FIG. 7 is a flowchart illustrating a flow of the optical device fabrication method according to the embodiment of the invention.

FIG. 7 is a flowchart illustrating a flow of an optical device fabrication method according to the embodiment of the invention. FIG. 8 is a diagram illustrating an adjustment process of the optical device fabrication method according to the embodiment of the invention.

As has been described before, this optical device includes the base member 150, the collective lens 151, the lens frame 152, the screws 155, 156 and the spacers 157 and is fabricated by fixing the collective lens 151 and the lens frame 152, which are the optical components, to the base member 150 via the spacers 157 by the screws 155, 156.

In the optical device fabrication method, firstly, a preparatory process of preparing a predetermined number of spacers 157 of the same thickness and the same shape is executed (step S1).

Next, a temporary fastening process of temporarily fastening the lens frame 152 which is the optical component, on which the collective lens 151 is mounted, in advance to the base member 150 by the two screws 155, 156 is executed (step S2).

Figure 8:
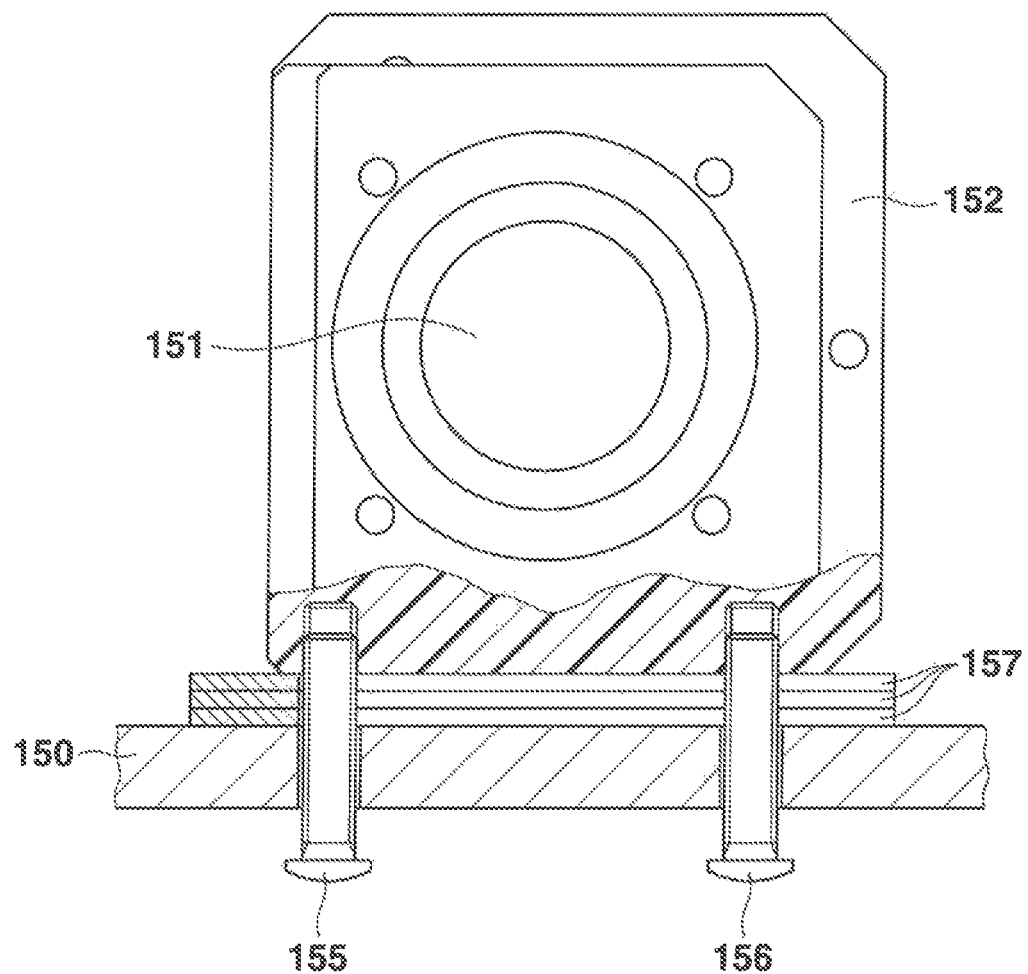
FIG. 8 is a diagram explaining an adjustment process of the optical device fabrication method according to the embodiment of the invention.

Following this, an adjustment process is executed in which a required number of spacers out of the predetermined number of spacers are inserted between the optical component and the base member 150 as shown in FIG. 8 so as to adjust a vertical mounting position of the optical component relative to the base member 150, that is, to adjust a distance therebetween (step S3).

A tightening process is executed in which after the required number of spacers 157 are inserted to adjust properly the distance between the optical component and the base member 150, the remaining spacers 157 of the U-shape that result after the required number of spacers out of the predetermined number of spacers are used are inserted between the base member 150 and the head portions of the screws 155, 156 from the side and the two screws 155, 156 are tightened (step S4).

Namely, when three spacers 157 are inserted between the optical component and the base member 150, a tightening process is executed in which as shown in FIG. 5, the remaining three spacers 157 are inserted between the base member 150 and the head portions of the screws 155, 156 from the side, and the screws 155, 156 are tightened.

In addition, when four spacers are inserted between the optical component and the base member 150, a tightening process is executed in which as shown in FIG. 6, the remaining two spacers are inserted between the base member 150 and the head portions of the screws 155, 156 from the side, and the two screws are tightened.

In this way, in the optical device fabrication method of the embodiment, the fitting amount A of the screws 155, 156 into the lens frame 152 becomes constant, which makes constant the tightening torque of the screws 155, 156 when the lens frame 152 is mounted on the base member 150, thereby making it possible to enhance the working efficiency and reliability in fabrication.

By adopting this configuration, the lens frame 152 can be fixed to the base member 150 uniformly without changing individually the length and tightening torque of the screws 155, 156.

Additionally, there may be a situation in which the spacers of which a total thickness is made constant so as to make the fitting amount A constant are disposed only on the base member 150 or only underneath the base member 150 depending upon the accuracy with which the optical component is produced.

Namely, provided that the total thickness of the spacers is kept constant, the total thickness of the spacers may be zero, that is, no spacer may be inserted on either side of the base member 150. The adjusting range can be widened by adopting this adjusting approach.

In this embodiment, while the fabrication is carried out by preparing the plurality of spacers 157 of the same thickness, a configuration may be adopted in which the fitting amount A is made constant by using spacers 157 of different thicknesses.

Namely, in the case of the example shown in FIG. 5, one spacer having a thickness equal to the three spacers 157 may be inserted on the base member 150, and one spacer having the thickness equal to the three spacers 157 may be inserted underneath the base member 150.

Additionally, in the case of the example shown in FIG. 6, one spacer having a thickness equal to four spacers 157 may be inserted on the base member 150, and one spacer having a thickness equal to the two spacers 157 may be inserted underneath the base member 150.

Further, spacers of different thicknesses may be combined together so as to be inserted on and underneath the base member 150 for adjusting.

In the embodiment, while the invention is described as being applied to the optical device of the collective lens group 111 that is positioned on the incident side of the luminescent light emitting device 100, the fabrication method and the configuration of the spacers 157 used in mounting the lens frame 152 on the base member 150 of the invention may be applied to either the collective lens 173 positioned near the light incident end of the light tunnel 175 or the lens that guides light to the light tunnel 175.

Additionally, in the embodiment, while the vertical adjustment of the optical axis of light incident on the collective lens 151 is described as being carried out in the optical device that is configured as described above, when the optical axis of the light is attempted to be adjusted in a horizontal direction, a configuration may be adopted in which the lens frame with the lens is mounted on a base member that rises vertically from the bottom portion of the projector 10 that is configured as described above from a side, and the spacers may be inserted between the base member and the lens frame.

A simple and easy approach can be adopted even in the examples shown in FIGS. 5, 6 where the optical axis of incident light on the collective lens 151 is adjusted in the vertical direction. In this simple and easy approach, screw holes for the screws 155, 156 are made not round but horizontally elongated. By adopting this configuration, the lens frame 152 can also be adjusted to a required position in the horizontal direction, whereafter the screws 155, 156 are tightened. Thus, the optical axis of incident light on the collective lens 151 can also be adjusted in the horizontal direction.

Thus, as has been described heretofore, according to the embodiment of the invention, the fabrication costs can be suppressed to the lower level by simplifying the fabrication steps, and the high-performance optical device, the fabrication method of this optical device and the projector 10 including this optical device can be provided.

In addition, according to the embodiment of the invention, since the predetermined number of spacers 157 all have the same thickness, the height of the lens frame 152 can easily be adjusted only by adjusting the number of spacers 157 to be inserted.

Additionally, since the fitting amount A of the screws 155, 156 into the lens frame 152 becomes constant within the adjustable range, the lens frame 152 can be fixed to the base member 150 uniformly without changing the length and tightening torque of the screws 155, 156.

Further, according to the embodiment of the invention, since the spacers 157 have the U-shape, the spacers 157 can be inserted from the side only by untightening the screws 155, 157 without removing the screws 155, 156.

Additionally, according to the embodiment of the invention, by fixing the optical device to the base member 150 by screwing the screws 155, 156 into the base member 150 in the vertical direction, the optical device can be fixed to the base member 150 in a superiorly accuracy and solidity.

Further, according to the embodiment of the invention, since the two screws 155, 156 are used, the predetermined plane can be fixed in place with a uniform force, thereby making it possible to suppress the rotation of the mounting position.

In addition, according to the embodiment of the invention, since the spacers 157 are made of stainless steel, corrosion can be prevented, and the deviation of the optical axis position occurring with progress of the time can be prevented, thereby making it possible to keep the luminance performance of projection light stable.

Further, according to the embodiment of the invention, since the optical device can be applied to any lens in the light source unit which guides red, green or blue light to the light tunnel 175, the mounting configuration of each lens in the projector 10 can be made simple.

Additionally, according to the embodiment of the invention, since the optical component includes a lens such as a collective lens, the positioning of the optical axis of emitted light can be made easy.

In addition, according to the embodiment of the invention, since the lens is the collective lens that is disposed between the excitation light sources 71 and the luminescent wheel 101, the positional adjustment can be carried out on light having the high directionality, thereby making it possible to execute the efficient luminance adjustment.

Further, according to the embodiment of the invention, since the incident light on the luminescent wheel 101 is the pencil of light having the smallest exit angle, the sensitivity to adjustment is high, and the efficient luminance adjustment can be executed only by adjusting the mounting position of the collective lens 151 by moving it slightly.

While the embodiment of the invention has been described, the embodiment has been described as the example of the invention and hence, there is no intention to limit the scope of the invention by the embodiment described. This novel embodiment can be made in various forms, and various omissions, replacements or alterations can be made to the embodiment without departing from the spirit and scope of the invention. This embodiment and modifications made thereto are included not only in the spirit and scope of the invention but also in the scope of claims and their equivalents.

What is claimed is:

1. An optical device, comprising:
   a base member; and
   an optical component fixed to the base member by at least one screw;
   wherein:
   a plurality of spacers are inserted in at least one of a first space defined between the optical component and the base member and a second space defined between the base member and a head portion of the screw, such that the optical component is fixed to the base member via the plurality of spacers;
   a total thickness of the spacers obtained by summing a thicknesses of each of the spacers inserted in the first space and a thickness of each of the spacers in the second space is made constant, when a sum of a number of the spacers inserted in the first space and a number of the spacers inserted in the second space is made constant;
   a tip of the screw is fitted into the optical component such that a fitting amount of the screw into the optical component remains constant even when a width of the first space changes based on the number of the spacers inserted in the first space.

2. The optical device as set forth in claim 1, wherein the plurality of spacers all have a same thickness and are superposed together, whereby the total thickness of the spacers is made constant.

3. The optical device as set forth in claim 1, wherein each of the spacers has a U-shape and is insertable in and removable from the first and second spaces from a side of the screw.

4. The optical device as set forth in claim 1, wherein the screw is screwed into the base member in a vertical direction, thereby fixing the optical component and the base member together.

5. The optical device as set forth in claim 1, wherein the optical component is fixed to the base member by two screws.

6. The optical device as set forth in claim 1, wherein each of the spacers comprises a stainless steel material.

7. The optical device as set forth in claim 1, further comprising a light source device.

8. The optical device as set forth in claim 1, wherein the optical component includes a lens.

9. The optical device as set forth in claim 8, wherein the lens comprises a collective lens that is disposed between an excitation light source and a luminescent wheel.

10. The optical device as set forth in claim 9, wherein the collective lens is positioned close to the luminescent wheel and collects (a) a pencil of light emitted from the excitation light source to the luminescent wheel and (b) a pencil of light emitted in a direction of the excitation light source.

11. A projector comprising:
    the light source device set forth in claim 7;
    a display element;
    a light source optical system that guides light from the light source device to the display element;
    a projection optical system that projects an image emitted from the display element on to a screen; and
    a projector control system that controls the light source device and the display element.

12. An optical device as set forth in claim 1, wherein the first space and the second space each have at least one of the plurality of spacers inserted therein.

* * * * *